United States Patent
Eerola et al.

(10) Patent No.: US 7,471,719 B2
(45) Date of Patent: *Dec. 30, 2008

(54) CORRELATOR

(75) Inventors: Ville Eerola, Julkujarvi (FI); Tapani Ritoniemi, Peraseinajoki (FI)

(73) Assignee: Atheros Technology Ltd., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/857,329

(22) Filed: Sep. 18, 2007

(65) Prior Publication Data

US 2008/0043822 A1    Feb. 21, 2008

Related U.S. Application Data

(63) Continuation of application No. 09/689,680, filed on Oct. 13, 2000, now Pat. No. 7,283,582.

(30) Foreign Application Priority Data

Oct. 13, 1999   (FI)   .................................. 19992209
Mar. 7, 2000    (FI)   .................................. 20000519

(51) Int. Cl.
    *H04B 1/00*     (2006.01)
(52) U.S. Cl. ...................................... 375/150; 375/152
(58) Field of Classification Search .................. 375/150, 375/147, 152, 142, 136, 130
    See application file for complete search history.

(56) References Cited

U.S. PATENT DOCUMENTS 4,365,338 A    12/1982   McRae et al.
4,707,839 A *  11/1987   Andren et al. .............. 375/150
4,833,479 A     5/1989   Carlson (Continued)

FOREIGN PATENT DOCUMENTS

EP        0772305 A2    5/1997

(Continued)

OTHER PUBLICATIONS

European Search Report dated Feb. 15, 2001.

(Continued)

*Primary Examiner*—Emmanuel Bayard
(74) *Attorney, Agent, or Firm*—Gates & Cooper LLP

(57) ABSTRACT

The present invention relates to a device for generating at least one code phase (Ce, Cp, Ci) the device comprising a shift register (702) comprising N outputs and to which a code sequence (Cin) to be phased is applied, and at least one logic branch (722, 723, 724) controlled by at least one combination control signal on the basis of which the logic branch combines the code phase from i outputs of the shift register (702). N is an integer greater than 2 and i is an integer between 2 and N. Said at least one logic branch preferably comprises i two-input selectors (901 to 909, 911 to 919, 921 to 929), to the first input of each of which is connected one input of the shift register (702) and to the second input is connected one combination control signal (ec0 to ec8, pc0 to pc8, lc0 to lc8), and an i-input combiner (910, 920, 930), to whose outputs are connected the outputs of said i selectors and from whose output said code phase is obtained.

17 Claims, 13 Drawing Sheets

U.S. PATENT DOCUMENTS

| | | |
|---|---|---|
| 5,377,225 A | 12/1994 | Davis |
| 5,512,894 A | 4/1996 | Ikeyama |
| 5,640,416 A | 6/1997 | Chalmers |
| 5,761,239 A | 6/1998 | Gold et al. |
| 5,903,595 A | 5/1999 | Suzuki |
| 5,920,589 A | 7/1999 | Rouquette et al. |
| 5,933,447 A | 8/1999 | Tran et al. |
| 5,999,561 A | 12/1999 | Naden et al. |
| 6,094,450 A | 7/2000 | Shockey |
| 6,208,685 B1 | 3/2001 | Yamazaki |
| 6,212,219 B1 | 4/2001 | Shou et al. |
| 6,275,520 B1 | 8/2001 | Nakamura et al. |
| 6,289,041 B1 | 9/2001 | Krasner |
| 6,445,714 B1 | 9/2002 | d'Anjou et al. |
| 6,463,561 B1 | 10/2002 | Bhawmik et al. |
| 6,496,474 B1 | 12/2002 | Nagatani et al. |
| 6,526,322 B1 | 2/2003 | Peng et al. |
| 6,650,689 B1 | 11/2003 | Oishi et al. |
| 2005/0094604 A1 | 5/2005 | Ozluturk et al. |

FOREIGN PATENT DOCUMENTS

| | | |
|---|---|---|
| EP | 0855796 A2 | 7/1998 |
| EP | 0874471 A2 | 10/1998 |
| EP | 0886386 A2 | 12/1998 |
| EP | 0924532 A2 | 6/1999 |
| EP | 0924871 A2 | 6/1999 |
| EP | 0944178 A2 | 9/1999 |
| EP | 0772305 A3 | 12/2001 |
| EP | 0855796 A3 | 7/2002 |
| EP | 0886386 A3 | 10/2002 |
| GB | 2315647 | 2/1998 |
| GB | 2315647 A | 2/1998 |

OTHER PUBLICATIONS

Bert Gyselinckx et al., "A 4*2.5Mchip/s Direct Sequence Spread Spectrum Receiver with Digital IF and Integrated ARM6 Core." In:IEEE 1997 Custom Integrated Circuites Conference, pp. 461-464.

* cited by examiner

+-1/2 chip phase difference; quadratic detection

+-1 chip phase difference; quadratic detection sum of +-1/2 - +-2 chip phase differences; quadratic detection linear combination of +-1/2 - +-2 chip phase differences; quadratic detection

US 7,471,719 B2

CORRELATOR

BACKGROUND OF THE INVENTION

The invention relates to a correlator in a receiver for a spread spectrum signal and particularly to the generation in the correlator of the different code phases required in the tracking of a spreading code.

In spread spectrum systems, the bandwidth used for transmitting a signal is substantially wider than is required for the data to be transmitted. The spectrum of a signal is spread in the transmitter by means of a pseudo-random spreading code, which is independent of the original data. In the receiver, a code replica, which is an identical copy of said spreading code, is used to narrow the spectrum of a signal. Spread spectrum systems can be coarsely divided into direct sequence (DS) spread spectrum systems and frequency hopping (FH) spread spectrum systems. In frequency hopping systems, the transmission frequency is varied in accordance with a pseudo-random spreading code within the limits of the available bandwidth, i.e. hopping occurs from one frequency to another. In direct sequence systems, the spectrum is spread to the available bandwidth by shifting the phase of the carrier in accordance with a pseudo-random spreading code. The bits of a spreading code are usually called chips as distinct from actual data bits.

To enable a spectrum to be narrowed in a direct sequence receiver, the receiver has to be able to synchronize with a received signal as accurately as possible and to maintain the synchronization. Rapid implementation of this synchronization is vital in several applications.

Advantages of spread spectrum systems include their resistance to interference, wherefore they are generally used in military applications. Furthermore, in direct sequence systems, the propagation time of a signal between a transmitter and a receiver can be accurately measured, enabling the use of applications utilizing distance measurement, such as positioning systems. Distance measurement is based on synchronization of a spreading code, which can usually be carried out very accurately, usually at an accuracy of more than 1/10 chip. Further, since the frequency of the code is high, very good measurement accuracy is achieved. When the transmission time of the code is known, the time taken up by the propagation of the signal can be calculated, which, by division with the speed of light, yields the distance between the transmitter and the receiver.

FIG. 1 shows a spread spectrum system based on a direct sequence, in which system a transmitter 101 comprises not only a data modulator 104, but also a spreading code modulator 106 for spreading a transmitted spectrum by means of a spreading code. A receiver 102 comprises a despreading modulator 108, which operates with a spreading code replica identical to said spreading code and correlates a received signal with said spreading code replica. If the spreading code and the spreading code replica generated in the receiver are identical, and the spreading code replica and the spreading code included in the received signal are in phase, a data modulated signal preceding the spreading is obtained from the output of the despreading modulator 108. At the same time, any spurious signals are spread. A filter 110, which succeeds the despreading modulator 108, lets the data modulated signal through, but removes most of the power of a spurious signal, which improves the signal-to-noise ratio of the received signal. In order for the system to operate, the spreading code replica generated in the receiver has to be and stay in phase with the spreading code included in the received signal. For this reason, a special synchronization algorithm is required for the spreading code in addition to regular carrier and data synchronization.

A known manner of implementing spreading code tracking is to use the correlator of FIG. 2, comprising two branches 202 and 204, in which an incoming signal $S_{in}$ is correlated with an early $C_e$ and late $C_l$ spreading code replica locally generated with generation means 209. Both branches comprise a multiplier 205, 206 for correlating the signal, a filter 207, 208, and a quadratic detector 210, 211 for detecting the correlation result. Correlation results 214 and 216 obtained from the branches 202 and 204 are subtracted from one another by an adder 212. A discrimination function depending on the phase difference of the local spreading code replica and the phase error of the code included in the incoming signal $S_{in}$ and on the function of the detector used is obtained from the output of the adder 212, and this discrimination function is used to adjust the phase of the spreading code in the right direction.

FIG. 3 shows the graph of a discrimination function, which has been normalized such that the maximum amplitude of the signal is ±1.

FIG. 4A shows another known correlator structure for spreading code tracking, i.e. a tau-dither correlator, in which the same correlator 402 is used alternately with an early $C_e$ and late $C_l$ spreading code replica locally generated with generation means 407. A loop filter 404 averages a difference 405 between alternate correlations, and as a result 406 is obtained a discrimination function similar to that in the implementation of FIG. 2. FIGS. 4B, 4C and 4D show the control signals g(t), ḡ(t) and g'(t), respectively, of the tau-dither correlator of FIG. 4A. Since in the tau-dither correlator, each correlation is calculated for only half the time, some of the signal-to-noise ratio of the signal is lost, but, owing to the smaller number of necessary components compared with the implementation of FIG. 2, this structure has been popular, particularly as an analog implementation. However, in present digital correlators, this structure is no longer much used.

FIG. 5 shows a third known structure for spreading code tracking. Here, early $C_e$ and late $C_l$ versions of a spreading code replica locally generated with generation means 509 are first subtracted from one another with an adder 506, and the obtained result 508 is correlated with an incoming signal $S_{in}$. This implementation is approximately equivalent to that of FIG. 2, but requires fewer components than the implementation of FIG. 2.

FIG. 6 shows a known structure for generating a phased code replica, i.e. a three-stage shift register 604. The generation means block of FIGS. 2, 4 and 5 can be replaced by the structure of FIG. 6. A code replica $C_{in}$ generated with a code generator 602 controlled by a clock signal $CLK_{gen}$ is clocked to the shift register 604 with a clock signal $CLK_{sr}$. An early $C_e$ (advanced) a precise $C_p$ and a late $C_l$ (delayed) code replica are obtained from the outputs 606, 608, 610, respectively, of the registers of the shift register. The phase difference of the code replica between two register elements is 1/F, wherein F is the clock frequency of the shift register. This phase difference usually varies from the length of one chip to that of 1/10 chip. The most used phase difference is ±½ chip, yielding the best result as regards discrimination. Smaller phase differences are used when spreading code phase tracking has to be more accurate, which is important particularly in distance measurement applications. A small phase difference of a spreading code results in a weaker signal-to-noise ratio for the discrimination signal used in spreading code replica tracking, but the error in spreading code tracking obtained as the final result is usually smaller than when a greater phase difference of a spreading code is used. The phase difference is usually generated by obtaining the clock signal $CLK_{sr}$ of the shift register from a clock generator controlled in accordance with the tracking algorithm of the spreading code, and the clock signal $CLK_{gen}$ of the code generator is generated by dividing the clock signal generated by the clock generator by a positive integer (usually between 2 and 10). If the division ratio exceeds two, 'narrow' correlation is involved, and is useful when the attempt is to decrease the phase error in spreading code tracking caused by multipath propagation. In such an implementation, the discrimination function can be changed by changing both the frequency of the clock generator and the division ratio in such a manner that the clock frequency of the code generator remains unchanged. The problem in such adjustment is that when the clock frequency is changed, the length in time of the shift register changes, which changes the timing of the generated spreading code replica. A three-stage shift register cannot either be used to implement more than ±1-chip wide 'wide' discrimination functions because of the autocorrelation properties of the spreading code, since when small code phase errors are used, a 'dead point' is created in the discrimination function, and at this point the value of the function is zero.

It is also known to use a longer than three-stage shift register for generating code phases and more complex discrimination functions in such a way that each output of the shift register is separately connected to a separate correlator. However, such a structure requires more components than the structure shown in FIG. 6.

BRIEF DESCRIPTION OF THE INVENTION

It is an object of the invention to provide a device for generating different code phases so as to allow the discrimination function to be changed without changing the ratio of the clock frequencies of the shift register and the code generator and to allow different phase differences and discrimination functions that are of different widths or complex to be implemented with a simple structure. The objects of the invention are achieved with a device, which is characterized by what is stated in the independent claims. The preferred embodiments are disclosed in the dependent claims.

In the invention, the desired code phase is generated by combining the desired outputs of a multi-stage shift register as a suitable linear combination with a special logic branch. Each code phase (e.g. early, precise or late) preferably has a separate logic branch, or code phases can be taken directly from the outputs of the shift register. There may be one or more such logic branches that generate code phases, and each output of the shift register can preferably be connected to more than one logic branch.

In an embodiment of the invention, different code phases are generated by combining the outputs of the shift register and by taking code phases directly from the outputs of the shift register.

In a second embodiment of the invention, all outputs of the shift register are connected to each logic branch. This allows corresponding code phases to be generated from any combination of shift register outputs.

In a third embodiment of the invention, shift register outputs are connected to logic branches and interlaced so that for example two early code phases and two late code phases are achieved.

According to still another embodiment of the invention, the combination of the shift register outputs is controlled at the logic branches at least with one combination control signal. This enables easy setting and change of a code phase by changing the combination control signal(s).

The invention is preferably suitable for the generation, in a correlator implemented with a correlator structure shown in FIG. 2, 3 or 5, of code phases having different phases and required in spreading code tracing. Such implementation of code tracing is necessary for example in spread spectrum receivers.

The device of the invention is advantageous as it allows the generated code phases to be changed by software and the out-of-phase code replicas obtained from different outputs of the shift register to be combined linearly in order to implement versatile discrimination functions. Furthermore, the device of the invention also enables the implementation of 'wide' discrimination functions.

BRIEF DESCRIPTION OF THE FIGURES

The invention will be described below in greater detail by preferred embodiments with reference to the attached drawings, in which.

DETAILED DESCRIPTION OF THE INVENTION

Figure 6:
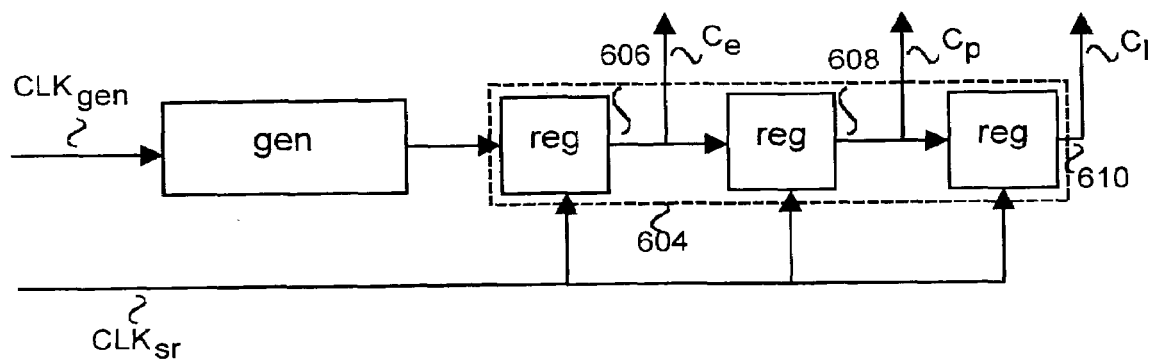
FIG. 6 shows a prior art structure for generating an early, precise and late code phase.
Figure 7:
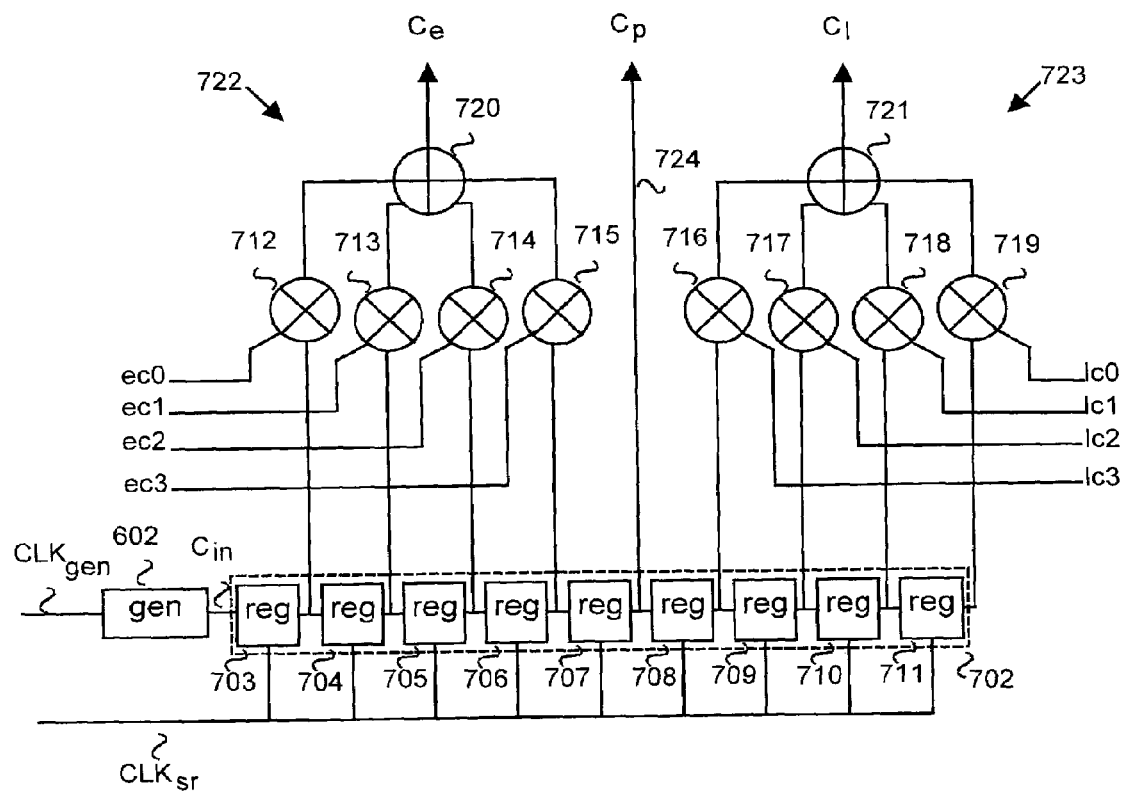
FIG. 7 shows an implementation according to the invention.

FIG. 7 shows an implementation according to the invention, comprising a 9-stage shift register 702 and an early 722, late 723 and a precise 724 branch for generating an early $C_e$, precise $C_p$ and late $C_l$ code phase, respectively. A code $C_{in}$, generated with a code generator 602 which is controlled by a clock signal $CLK_{gen}$ and corresponds to the code generator shown in FIG. 6, is applied to the shirt register 702, which comprises registers 703 to 711 and is controlled by a clock signal $CLK_{sr}$. Branch 722 comprises four multipliers 712 to 715 and a 4-input adder 720, and branch 723 comprises four multipliers 716 to 719 and a 4-input adder 721. To the inputs of multipliers 712 to 715 of branch 722 are connected the outputs of registers 703 to 706, respectively, and combination control signals ec0 to ec3, which are used to set weighting coefficients for the outputs of registers 703 to 706. The outputs of multipliers 712 to 715 are connected to the outputs of adder 720, and the early code phase $C_e$ is obtained from the output of adder 720. To the inputs of multipliers 716 to 719 of branch 723 are connected outputs of registers 708 to 711, respectively, and combination control signals lc0 to lc3, which are used to set weighting coefficients for the outputs of registers 708 to 711. The outputs of multipliers 716 to 719 are connected to the inputs of adder 721, and the late code phase $C_l$ is obtained from the output of adder 721. The output of register 707 is connected to branch 724, from whose output the precise code phase $C_p$ is obtained. The implementation of FIG. 7 can be advantageously used also without the precise branch 724 in a correlator structure of the kind shown in FIG. 5.

Figure 8:
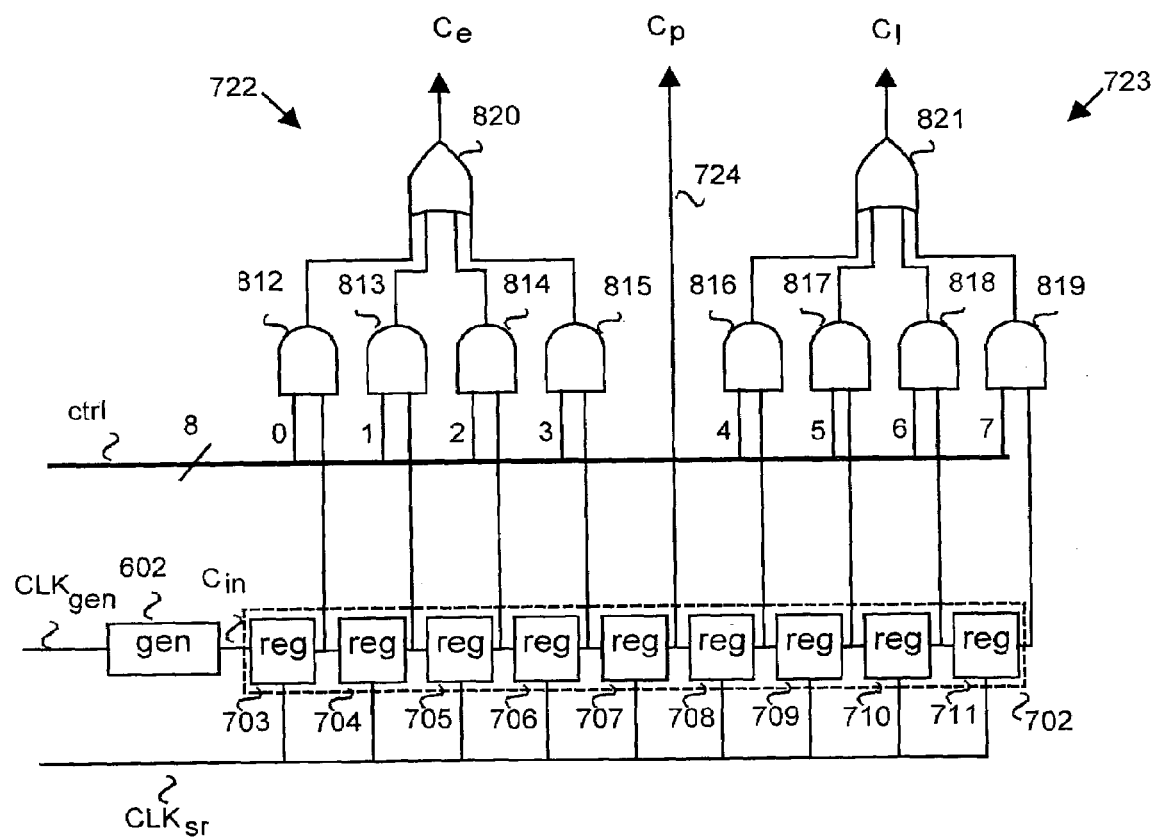
FIG. 8 shows a one-bit implementation of the implementation of FIG. 7.

FIG. 8 shows a one-bit implementation of the structure of FIG. 7, in which multipliers 712 to 719 and adders 720 and 721 are implemented with AND components 812 to 819 and OR components 820 and 821, respectively. An 8-bit control signal ctrl corresponds to the control signals ec0 to ec3 and lc0 to lc3. This circuit is useful when one of the outputs of registers 703 to 706 is selected to branch 722 and one of the outputs of registers 708 to 711 is selected to branch 723.

Figure 9A:
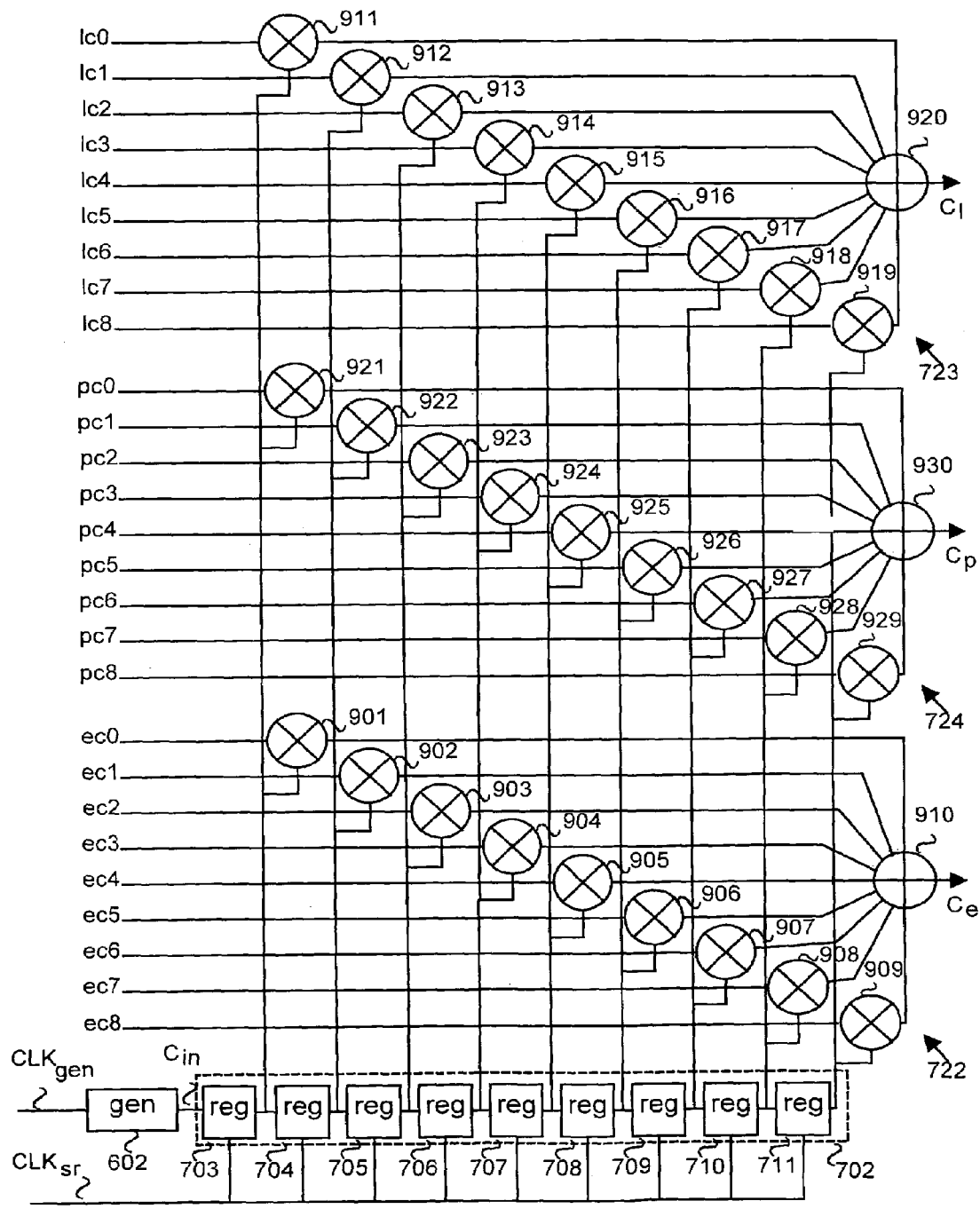
FIG. 9A shows a second implementation according to the invention.

FIG. 9A shows a second implementation according to the invention, which, corresponding to the implementation of FIG. 7, comprises a code generator 602, a 9-stage shift register 702 and branches 722, 723 and 724 for generating an early $C_e$, precise $C_p$ and late $C_l$ code phase, respectively. In this case branch 722 comprises nine multipliers 901 to 909 and a 9-input adder 910, branch 723 comprises nine multipliers 911 to 919 and a 9-input adder 920, and branch 724 comprises nine multipliers 921 to 929 and a 9-input adder 930. To the inputs of multipliers 901 to 909 of branch 722 are connected the outputs of registers 703 to 711, respectively, and combination control signals ec0 to ec8, which are used to set early branch weighting coefficients for the outputs of registers 703 to 711. The outputs of multipliers 901 to 909 are connected to the inputs of adder 910 and the early code phase $C_e$ is obtained from the output of adder 910. To the inputs of multipliers 911 to 919 of branch 723 are connected the outputs of registers 703 to 711, and combination control signals lc0 to lc8, which are used to set late branch weighting coefficients for the outputs of registers 703 to 711. The outputs of multipliers 911 to 919 are connected to the inputs of adder 920, and the late code phase $C_l$ is obtained from the output of adder 920. To the inputs of multipliers 921 to 929 of branch 724 are connected the outputs of registers 703 to 711, and combination control signals pc0 to pc8, which are used to set precise branch weighting coefficients for the outputs of registers 703 to 711. The outputs of multipliers 921 to 929 are connected to the inputs of adder 930 and the precise code phase $C_p$ is obtained from the output of adder 930.

Figure 9B:
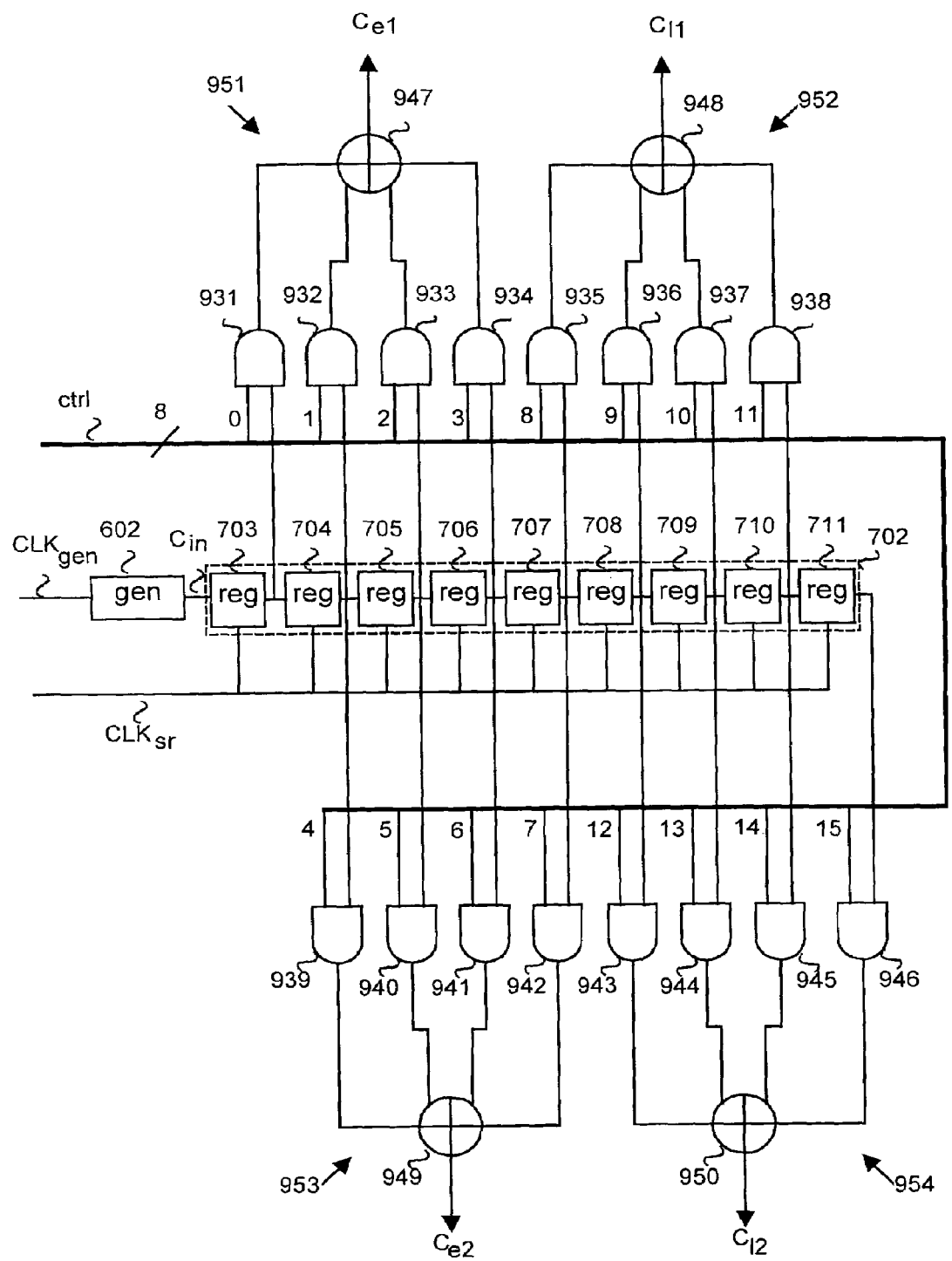
FIG. 9B shows a third implementation according to the invention.

FIG. 9B shows a third implementation according to the invention, in which two early $C_{e1}$ and $C_{e2}$ and two late $C_{l1}$ and $C_{l2}$ code phases are generated. The implementation comprises a code generator 602 and a 9-stage shift register 702, corresponding to the implementation of FIG. 7. In addition, the implementation comprises four logic branches 951 to 954 for generating said two early $C_{e1}$ and $C_{e2}$ and two late $C_{l1}$ and $C_{l2}$ code phases. A 16-bit combination control signal CTRL controls the combination. Logic branch 951 comprises four logic gates 931 to 934 and a four-input adder 947, logic branch 952 comprises four logic gates 935 to 938 and a four-input adder 948, logic branch 953 comprises four logic gates 939 to 942 and a four-input adder 949 and logic branch 954 comprises four logic gates 943 to 946 and a four-input adder 950. Logic gates 931 to 946 are three-level logic gates comprising a control input ctrl, a data input data_in and an output data_out, and which implement the truth table according to Table 1.

TABLE 1

Truth table of logic gates 931-946

| ctrl | data_in | data_out |
|---|---|---|
| 0 | −1 | 0 |
| 0 | 0 | 0 |
| 0 | +1 | 0 |
| 1 | −1 | −1 |
| 1 | 0 | 0 |
| 1 | +1 | +1 |

To the data and control inputs of logic gates 931 to 934 of branch 951 are connected the outputs of registers 703 to 706, respectively, and bits 0 to 3 of combination control signal CTRL, the bits being able to be used to select the outputs of registers 703 to 706 that are to be connected to this branch 951. The outputs of logic gates 931 to 934 are connected to the inputs of adder 947, and the first early code phase $C_{e1}$ is obtained from the output of adder 947. To the data and control inputs of logic gates 939 to 942 of branch 953 are connected the outputs of registers 704 to 707, respectively, and bits 4 to 7 of combination control signal CTRL, the bits being able to be used to select the outputs of registers 704 to 707 that are to be connected to this branch 953. The outputs of logic gates 939 to 942 are connected to the inputs of adder 949, and the second early code phase $C_{e2}$ is obtained from the output of adder 949. To the data and control inputs of logic gates 935 to 938 of branch 952 are connected the outputs of registers 707 to 710, respectively, and bits 8 to 11 of combination control signal CTRL, the bits being able to be used to select the outputs of registers 707 to 710 that are to be connected to this branch 952. The outputs of logic gates 935 to 938 are connected to the inputs of adder 948, and the first late code phase $C_{l1}$ is obtained from the output of adder 948. To the data and control inputs of logic gates 943 to 946 of branch 954 are connected the outputs of registers 708 to 711, respectively, and bits 12 to 15 of combination control signal CTRL, the bits being able to be used to select the outputs of registers 708 to 711 that are to be connected to this branch 954. The outputs of logic gates 943 to 946 are connected to the inputs of adder 950, and the second late code phase $C_{l2}$ is obtained from the output of adder 950.

Figure 3:
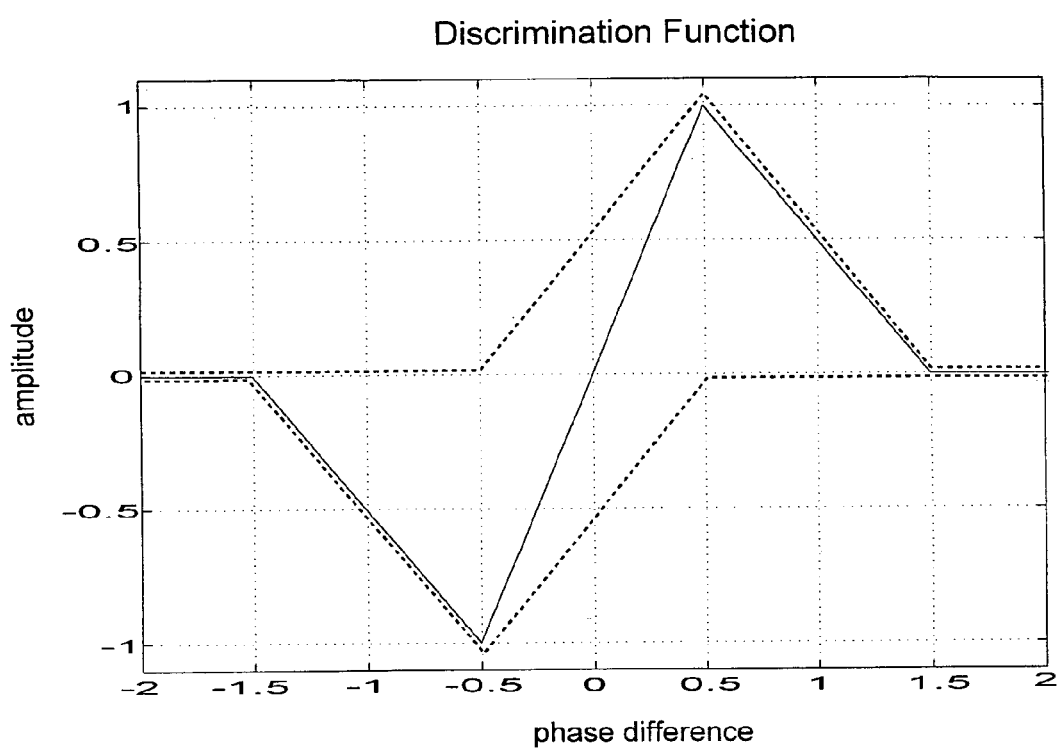
FIG. 3 shows the graph of a discrimination function.
Figure 4A:
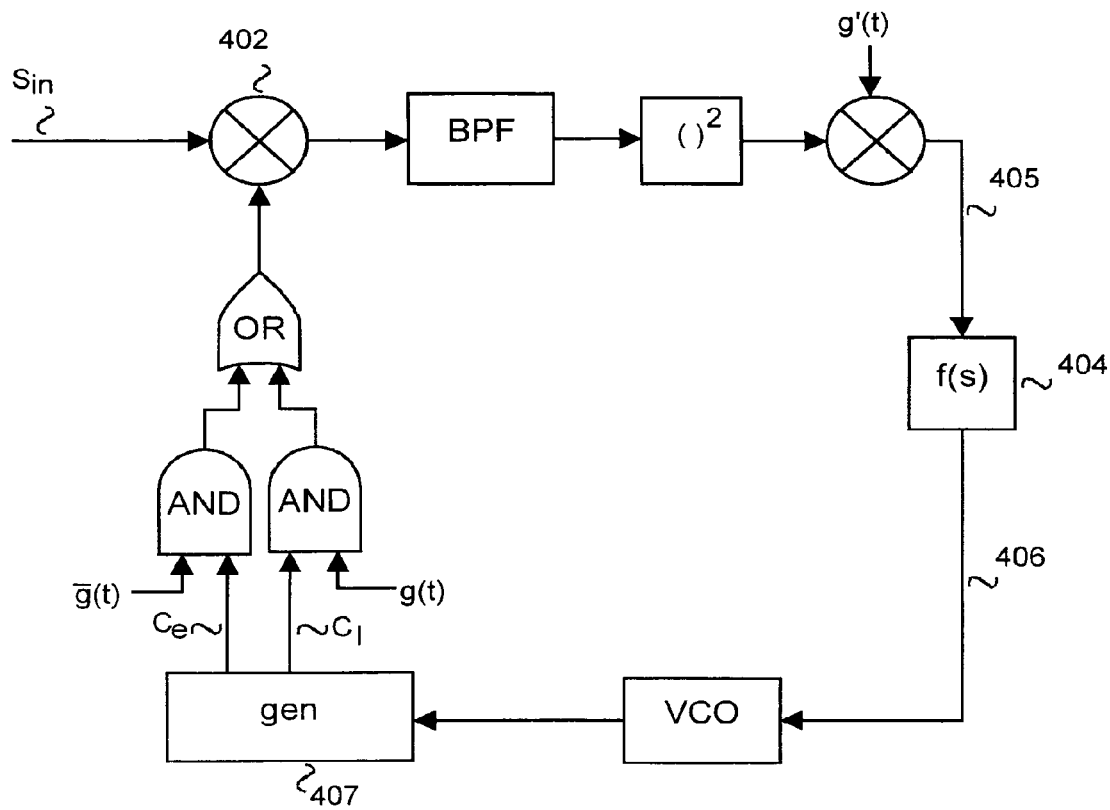
FIG. 4A shows a second prior art correlator structure.
Figure 4B:
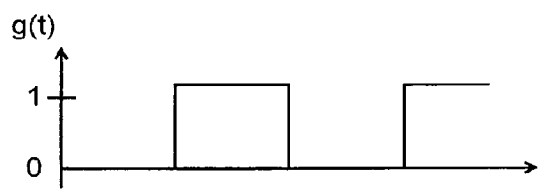
FIGS. 4B, 4C and 4D show control signals of the correlator structure of FIG. 4A.
Figure 4C:
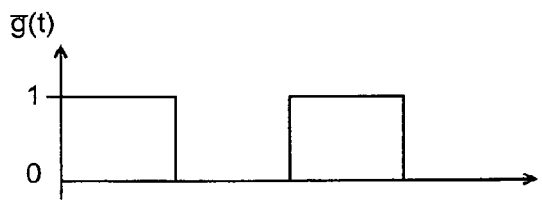
Figure 4D:
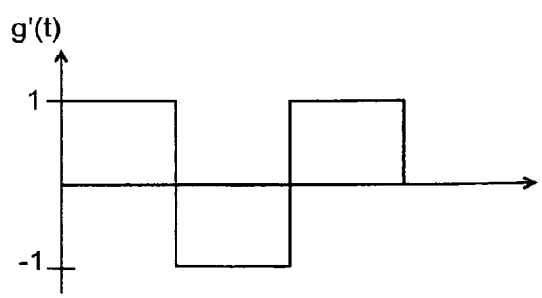

FIGS. 10A to 13D show discrimination functions generated from different code phases obtained by means of different combination control signals using the structure of FIG. 7. The graphs are normalized in the same way as the graph of FIG. 3, i.e. maximum amplitude is ±1. Accordingly, the graphs are not directly comparable, but rather show the shape and width of a discrimination function in each particular case. The shape of a discrimination function depends on both the phasing of the shift register 702 and the function of the detector used to detect the correlation result. When linear detection is used, coherent reception has to be used, and the detection is carrier out at the I branch of the I/Q signal. When quadratic detection is used, the detection is carried out at both the I and Q branches, and the results obtained are summed up. Discrimination functions have the general form:

$$D(\tau)=Re(\det(C(\tau,dout\_e, \text{in})))-Re(\det(C(\tau,dout\_l, \text{in}))),$$

wherein
det ( )=detector function, which is
for a linear detector: det $(I+jQ)=I$, and
for a quadratic detector: det $(I+jQ)=I^2+Q^2$,
$C(\tau, x, y)$=correlation function for phase difference $\tau$:

$$C(\tau, x, y)=\int x(t)y(t+\tau),$$

$\tau$=phase difference between incoming signal and precise code phase, dout_e=early code phase,
dout_l=late code phase,
in=signal incoming to receiver.

Figure 10A:
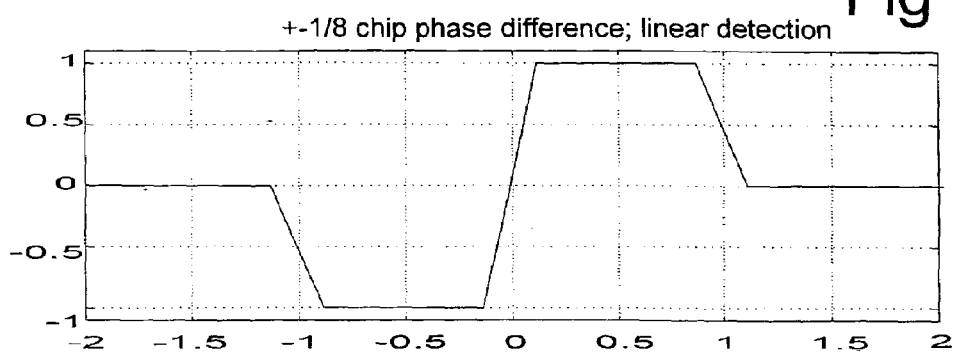
FIGS. 10A to 13D show the graphs of discrimination functions obtained with a structure according to the invention.
Figure 10B:
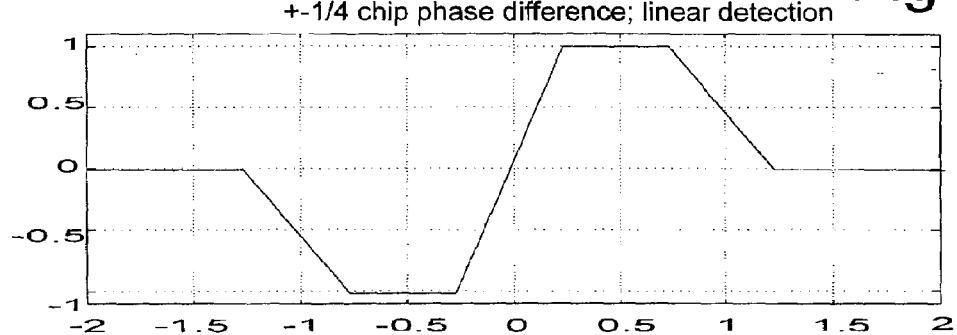
Figure 10C:
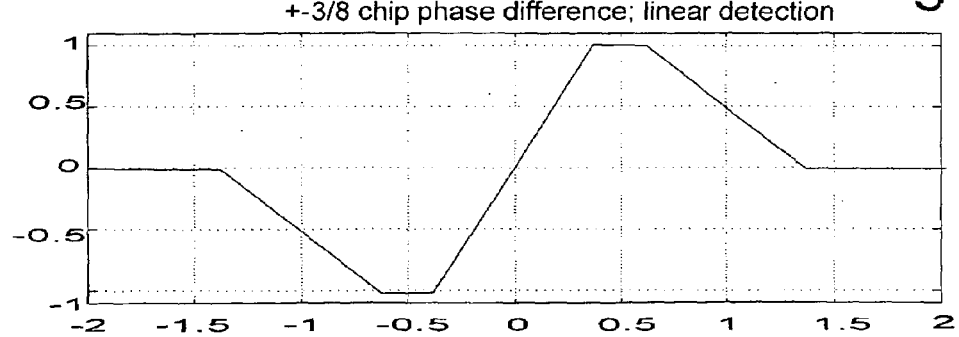
Figure 10D:
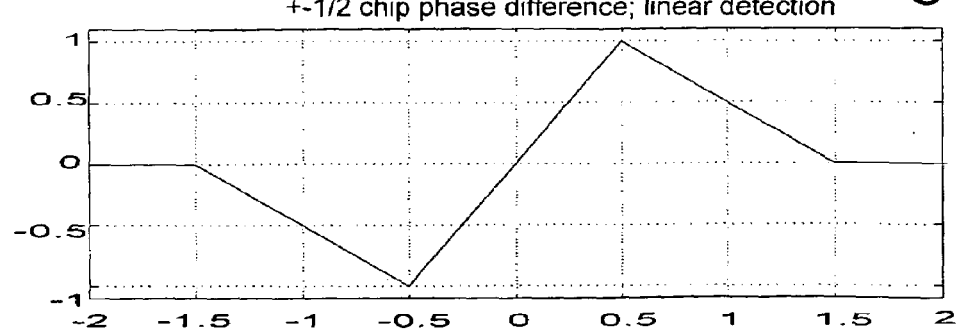

FIGS. 10A to 10D show discrimination functions of a 'narrow' correlator, obtained by linear detection. One output of the shift register 702 is selected to the early 722 and late 723 branches. The clock frequency of the shift register 702 used is 8*chip frequency (=8*clock frequency of code generator), i.e. the phase difference between the outputs of two successive registers of the shift register 702 is ⅛ chip long. In FIG. 10A, the output of register 706 is selected to the early branch 722, and the output of register 708 is selected to the late branch 723. In FIGS. 10B, 10C and 10D, the corresponding registers are 705 and 709, 704 and 710, 703 and 711, respectively.

Figure 11A:
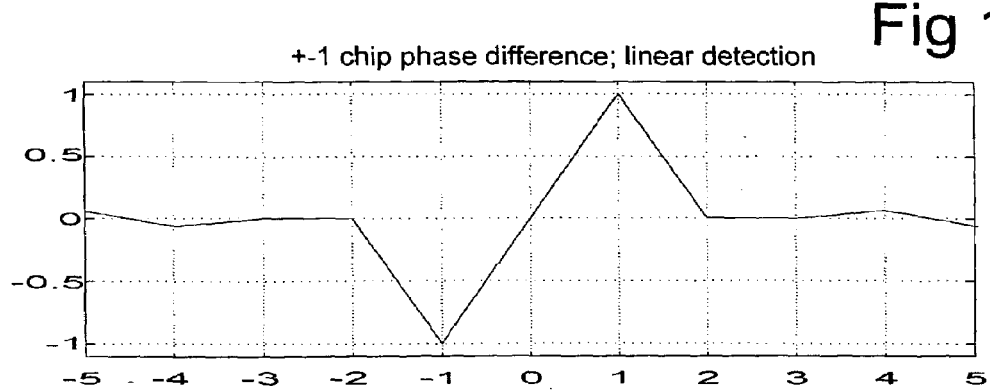
Figure 11B:
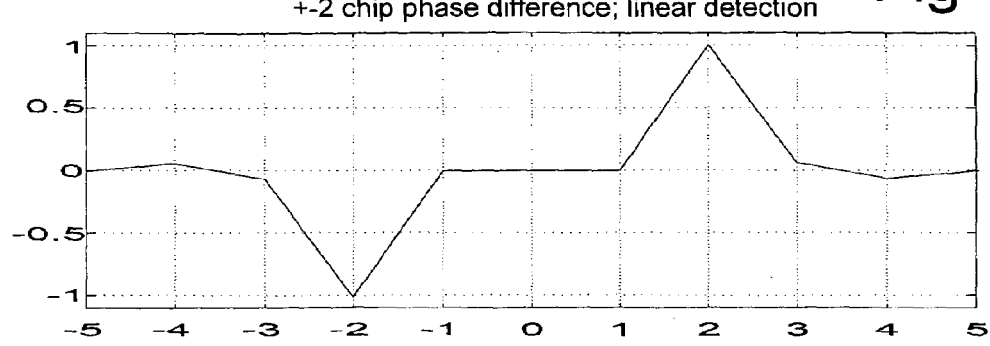
Figure 11C:
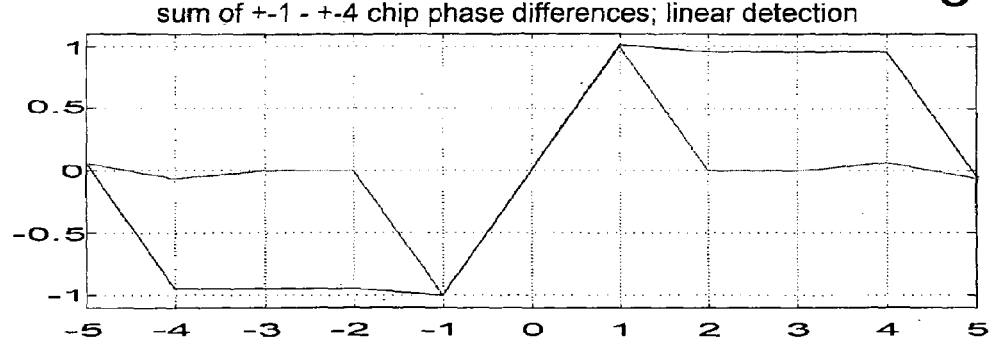
Figure 11D:
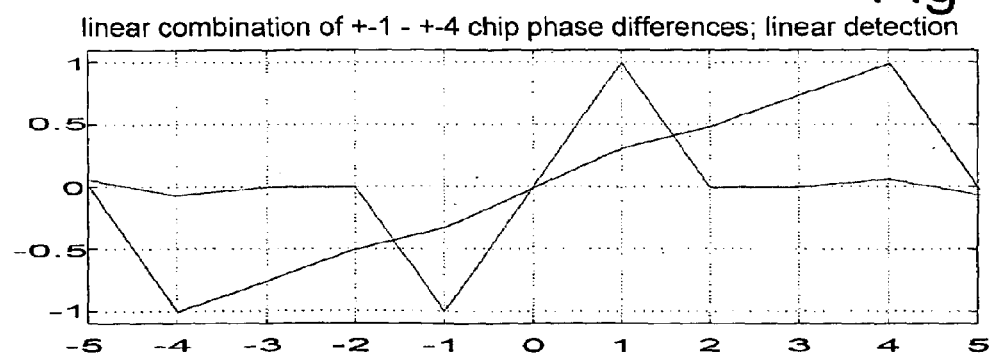

FIGS. 11A to 11D show discrimination functions of a 'wide' correlator, obtained by linear detection. The clock frequency of the shift register 702 used is the same as the chip frequency, i.e. the phase difference between two successive register outputs of the shift register 702 is 1 chip long. In FIG. 11A, the output of register 706 is selected to the early branch 722, and the output of register 708 is selected to the late branch 723. In FIG. 11B, the corresponding registers are 705 and 709. In FIG. 11C, the outputs of registers 703 to 706, summed up, are selected to the early branch, and the outputs of registers 708 to 711, summed up, are selected to the late branch. In FIG. 11D, the sum of the outputs of registers 703, 704, 705 and 706 is selected to the early branch, the sum being weighted with weighting coefficients 4, 3, 2 and 1, respectively, and the sum of the outputs of registers 708, 709, 710 and 711 is selected to the late branch, the sum being weighted with weighting coefficients 1, 2, 3 and 4, respectively.

Figure 12A:
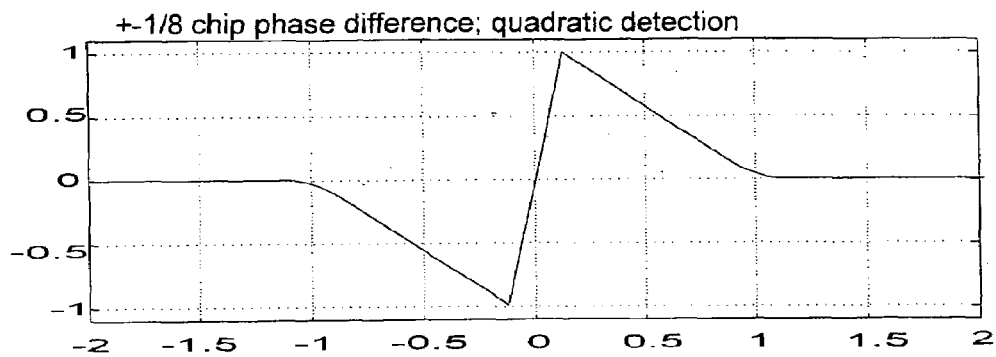
Figure 12B:
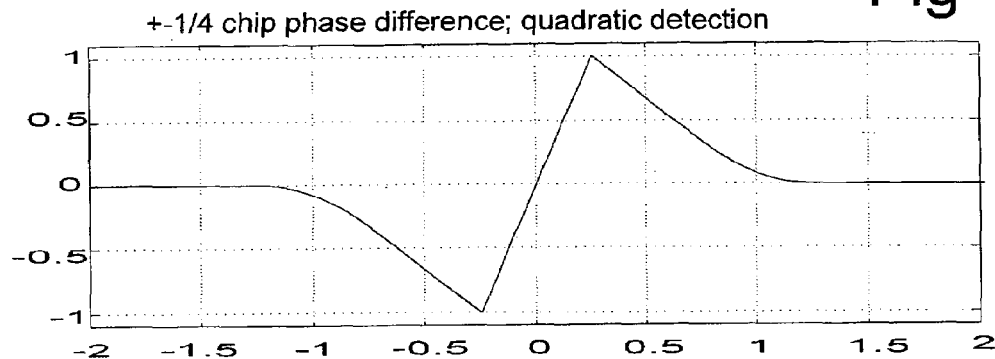
Figure 12C:
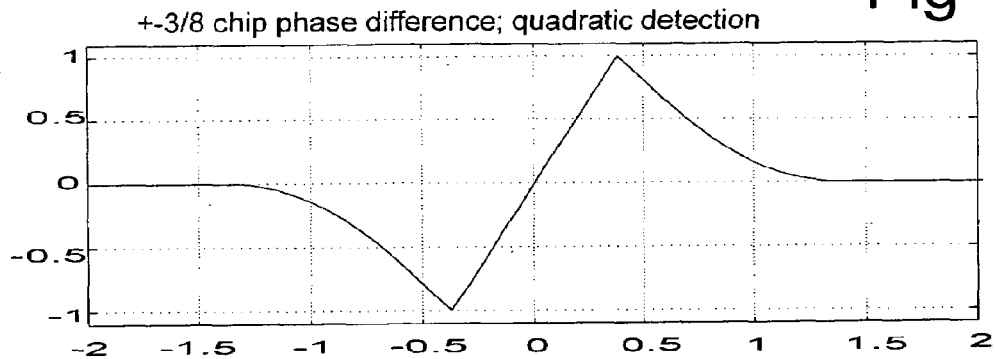
Figure 12D:
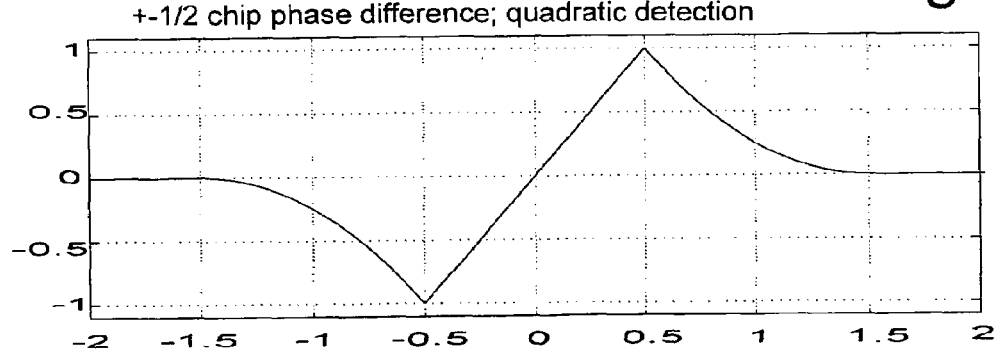

FIGS. 12A to 12D show discrimination functions of a 'narrow' correlator, obtained by quadratic detection. One output of the shift register 702 is selected to the early 722 and late 723 branches. The employed shift register 702 clock frequency is 8*chip frequency, i.e. the phase difference between the outputs of two successive registers of the shift register 702 is ⅛ chip long. In FIG. 12A, the output of register 706 is selected to the early branch 722, and the output of register 708 is selected to the late branch 723. In FIGS. 12B, 12C and 12D, the corresponding registers are 705 and 709, 704 and 710, 703 and 711, respectively.

Figure 13A:
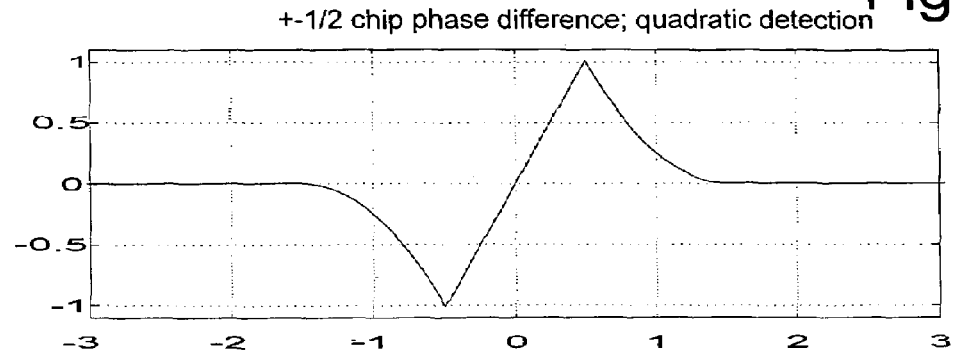
Figure 13B:
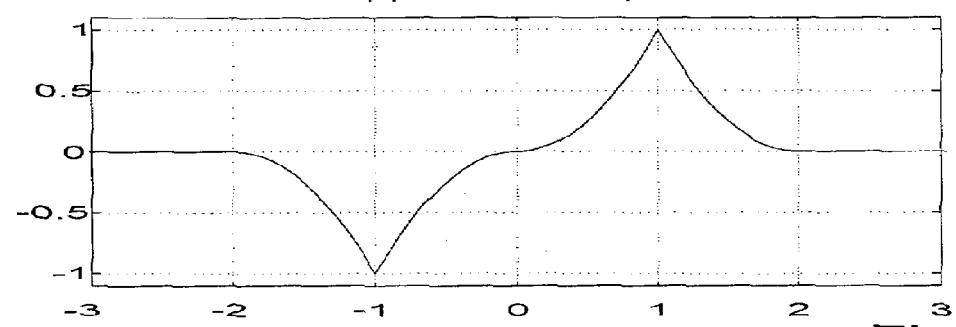
Figure 13C:
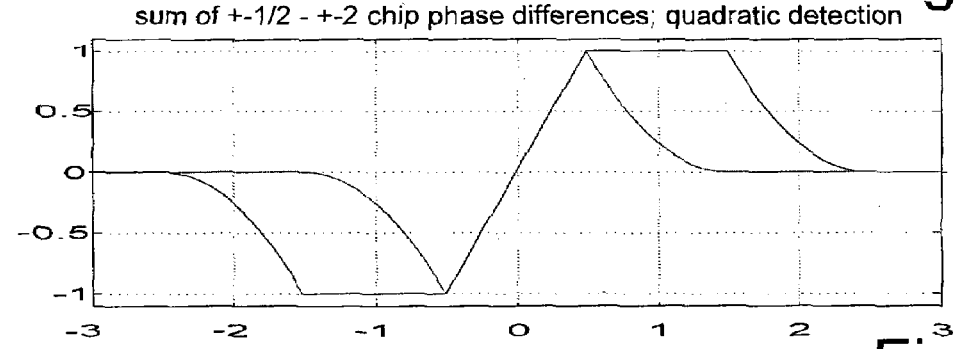
Figure 13D:
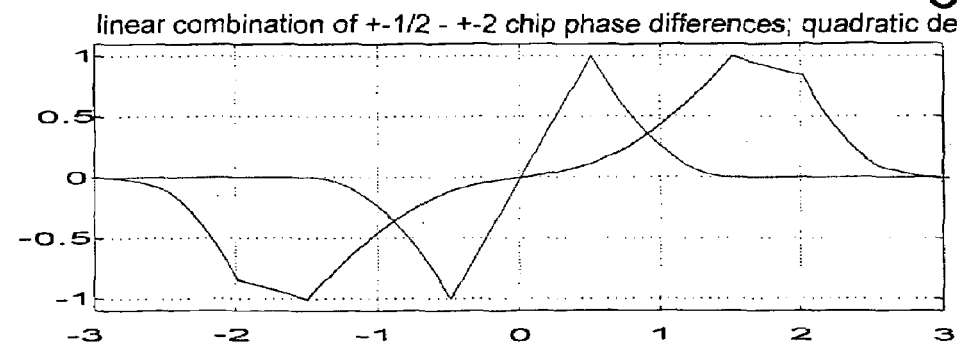

FIGS. 13A to 13D show discrimination functions of a 'wide' correlator, obtained by quadratic detection. The employed shift register 702 clock frequency is 2*chip frequency, i.e. the phase difference between two successive register outputs of the shift register 702 is ½ chip long. In FIG. 13A, the output of register 706 is selected to the early branch 722, and the output of register 708 is selected to the late branch 723. In FIG. 13B, the corresponding registers are 705 and 709. In FIG. 13C, the outputs of registers 703 to 706, summed up, are selected to the early branch, and the outputs of registers 708 to 711, summed up, are selected to the late branch. In FIG. 13D, the sum of the outputs of registers 703, 704, 705 and 706 is selected to the early branch, the sum being weighted with weighting coefficients 4, 3, 2 and 1, respectively, and the sum of the outputs of registers 708, 709, 710 and 711 is selected to the late branch, the sum being weighted with weighting coefficients 1, 2, 3 and 4, respectively.

The structure of the invention is not limited to a three-branch implementation only. The precise code phase can be generated as a combination of the early and late code phases, allowing the use of the structure of the invention as two-branched. The structure of the invention can be used as single-branched for example in the correlator shown in FIG. 5, in which the early and late code phases are summed up before correlation, by replacing the generator 509 and the adder 506 by the single-branch structure and code generator of the invention. Structures according to the invention including more than three branches are also feasible.

Figure 1:
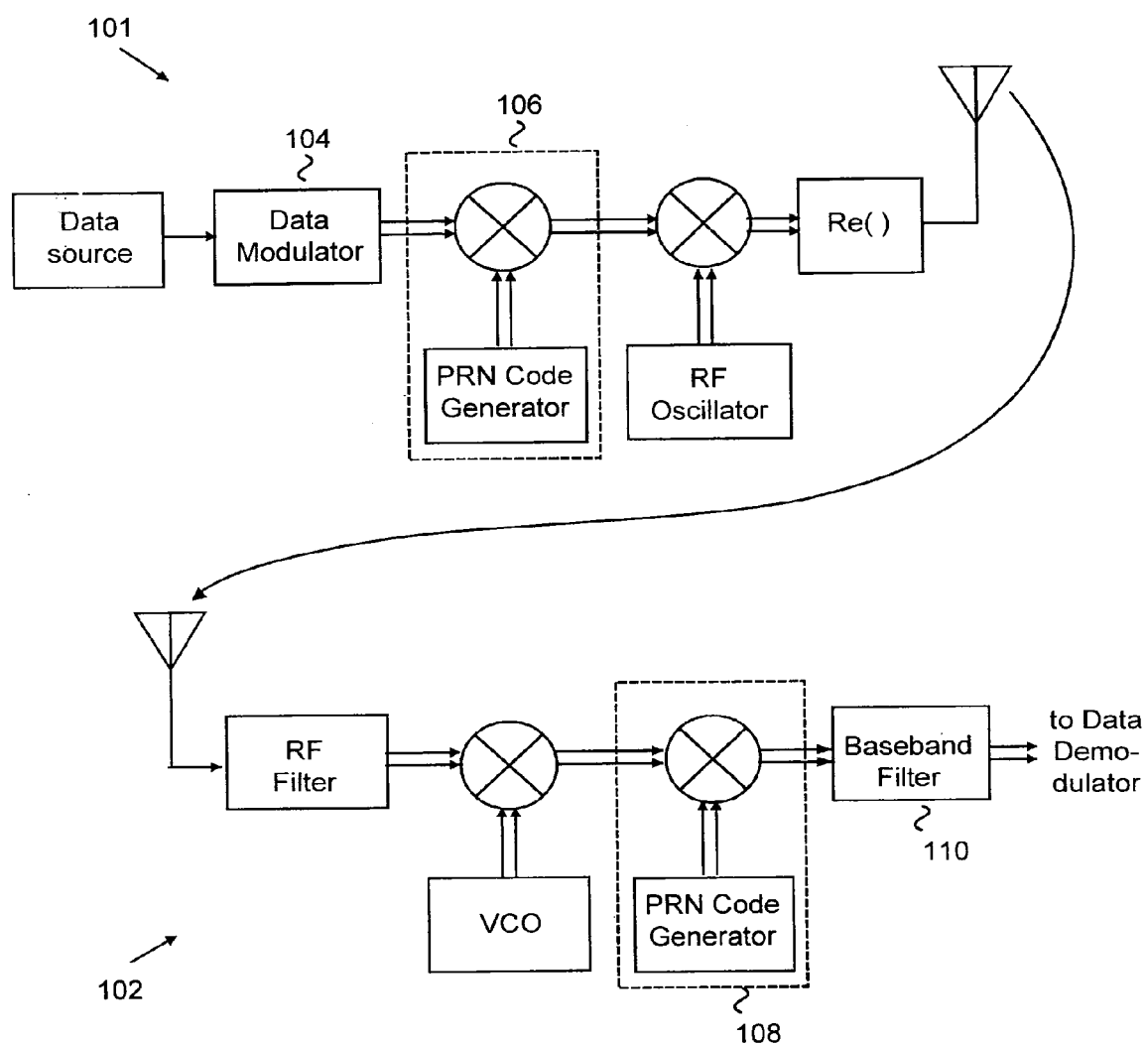
FIG. 1 shows a spread spectrum system based on a direct sequence.
Figure 2:
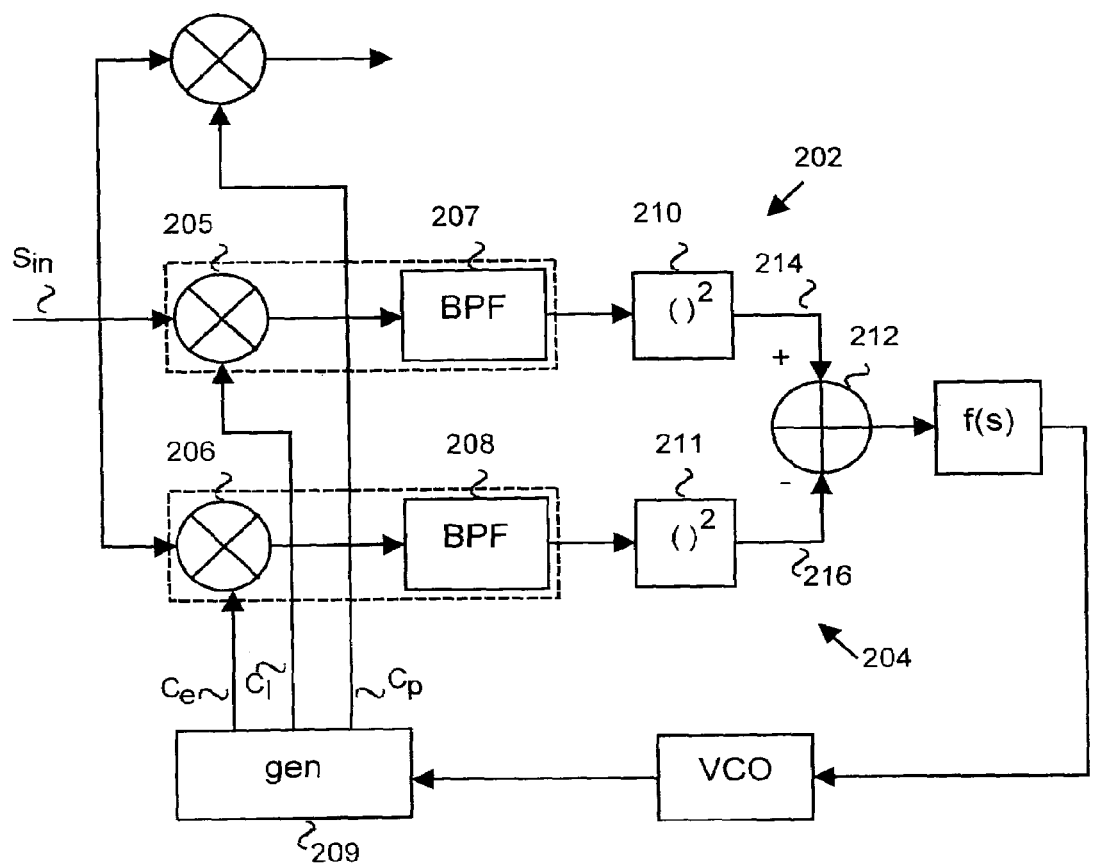
FIG. 2 shows a prior art correlator structure.
Figure 5:
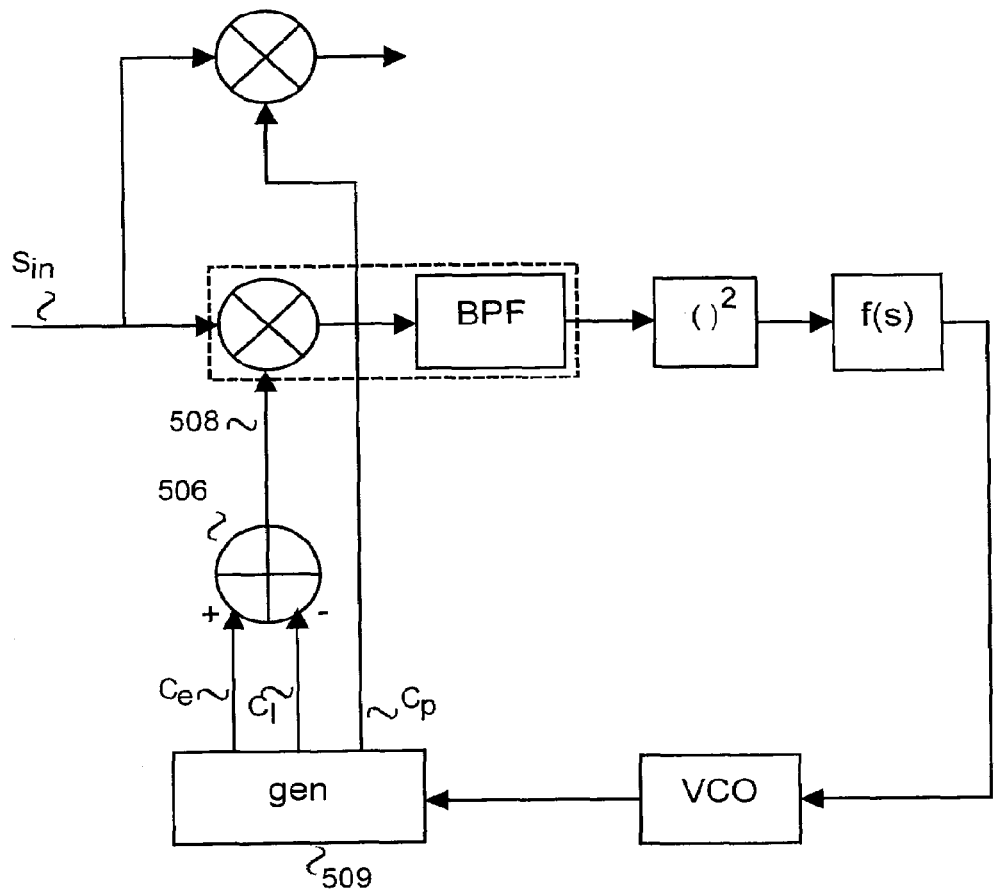
FIG. 5 shows a third prior art correlator structure.

The structure of the invention, combined with a code generator, is usable for example in the correlator shown in FIG. 2, 4 or 5, by replacing the generator 209, 407 or 509, respectively, with the structure and code generator of an embodiment of the invention. In other respects, the structure and operation of the correlator are as shown in the figures. Such a correlator can be used for example in the spread spectrum receiver 102 of FIG. 1. The invention thus relates also to a correlator and/or spread spectrum receiver, or the like device using the structure of the invention.

It is obvious to a person skilled in the art that as technology advances, the basic idea of the invention can be implemented in a variety of ways. The invention and its embodiments are thus not limited to the above examples, but may vary within the scope of the claims.

What is claimed is:

1. A device for generating at least one code phase for a code sequence, comprising:
   a shift register which receives the code sequence and comprises a plurality of outputs, the shift register being controlled by a first clock signal; and
   a plurality of phase delay networks, coupled to the shift register and controlled by a second clock signal distinct from the first clock signal, at least one of the phase delay networks comprising:
      a plurality of multipliers, each multiplier respectively coupled to the plurality of outputs of the shift register thereby receiving an input signal comprising a sequentially delayed code sequence signal, wherein each multiplier also receives a control signal; and
      an adder, coupled to the output of the plurality of multipliers, wherein the control signal selects only one of the sequentially delayed code sequence signals to reach the adder of each of the plurality of phase delay networks.

2. The device of claim 1, wherein at least one of the plurality of phase delay networks comprises:
   i-two-input selectors, to the first input of each of which is connected one input of the shift register and to the second input is connected one combination control signal, and
   an i-input combiner, to whose outputs are connected the outputs of said i selectors and from whose output said code phase is obtained.

3. The device of claim 1, the plurality of phase delay networks comprising at least a first phase delay network and a second phase delay network, wherein
   the first phase delay network comprises an output that provides an early code phase for the code sequence; and
   the second phase delay network comprises an output that provides a late code phase for the code sequence.

4. The device of claim 3, wherein the plurality of phase delay networks further comprises a third phase delay network connected directly to the output of one register of the shift register and from which the third code phase is obtained.

5. The device of claim 4, wherein the first, second and third code phases obtained from the first, second and third logic branches, respectively, are an early, later and precise code phase, respectively.

6. The device of claim 5, further comprising a fourth logic branch for obtaining a fourth code phase.

7. The device of claim 1, wherein the code phases obtained from the plurality of multipliers are changed by software by changing the control signals.

8. A correlator comprising:
generation means comprising a code generator for generating a local code, and a shift register, the shift register being controlled by a clock signal, the generation means generating at least one code phase from said local code, and
at least one correlator coupled to the shift register for correlating a signal applied to the correlator with the at least one locally generated code phase,
said generation means further comprising a plurality of phase delay networks, coupled to the shift register controlled by a second clock signal distinct from the first clock signal, at least one of the phase delay networks comprising:
a plurality of multipliers, each multiplier respectively coupled to the plurality of outputs of the shift register thereby receiving an input signal comprising a sequentially delayed code sequence signal, wherein each multiplier also receives a control signal; and
an adder, coupled to the output of the plurality of multipliers, wherein the control signal selects only one of the sequentially delayed code sequence signals to reach the adder of each of the plurality of phase delay networks.

9. The correlator of claim 8, wherein at least one of the plurality of phase delay networks of said generation means comprises
i two-input selectors, to the first input of each of which is connected one input of the shift register and to the second input is connected one control signal, and
an i-input combiner, to whose outputs are connected the outputs of said i selectors and from whose output said code phase is obtained.

10. The correlator of claim 8, the plurality of phase delay networks comprising at least a first phase delay network and a second phase delay network, wherein
the first phase delay network comprises an output that provides an early code phase for the code sequence; and
the second phase delay network comprises an output that provides a late code phase for the code sequence.

11. The correlator of claim 10, wherein the plurality of phase delay networks further comprises a third phase delay network connected directly to the output of one register of the shift register and from which the third code phase is obtained.

12. The correlator of claim 11, wherein the first, second and third code phases obtained from the first, second and third logic branches, respectively, are an early, later and precise code phase, respectively.

13. The correlator of claim 12, further comprising a fourth logic branch for obtaining a fourth code phase.

14. The correlator of claim 8, wherein the code phases obtained from the plurality of multipliers are changed by software by changing the control signals.

15. A spread spectrum receiver for receiving a spread spectrum signal, the spread spectrum receiver comprising
generation means comprising a code generator for generating a local code, and a shift register, the shift register being controlled by a clock signal, the generation means generating at least one code phase from said local code, and
at least one correlator for correlating a signal applied to the correlator with the at least one locally generated code phase,
said generation means further comprising a plurality of phase delay networks, controlled by a second clock signal distinct from the first clock signal, at least one of the phase delay networks comprising:
a plurality of multipliers, each multiplier respectively coupled to the plurality of outputs of the shift register thereby receiving an input signal comprising a sequentially delayed code sequence signal, wherein each multiplier also receives a control signal; and
an adder, coupled to the output of the plurality of multipliers, wherein the control signal selects only one of the sequentially delayed code sequence signals to reach the adder of each of the plurality of phase delay networks.

16. The spread spectrum receiver of claim 15, wherein at least one phase delay network of said generation means comprises
i two-input selectors, to the first input of each of which is connected one input of the shift register and to the second input is connected one combination control signal, and
an i-input combiner, to whose outputs are connected the outputs of said i selectors and from whose output said code phase is obtained.

17. The spread spectrum receiver of claim 16, wherein said code phase is phased spreading code replica.

* * * * *